United States Patent [19]
Damon

[11] 3,940,160
[45] Feb. 24, 1976

[54] INDEPENDENT WHEEL SUSPENSION FOR MOTOR VEHICLES
[75] Inventor: James J. Damon, Dearborn, Mich.
[73] Assignee: Ford Motor Company, Dearborn, Mich.
[22] Filed: Dec. 23, 1974
[21] Appl. No.: 535,541

[52] U.S. Cl............................ 280/96.2 R; 280/124 A
[51] Int. Cl.² ........................................... B60G 11/58
[58] Field of Search ....... 280/96.2 R, 124 A, 124 R; 403/227, 225

[56] References Cited
UNITED STATES PATENTS
| | | | |
|---|---|---|---|
| 3,061,329 | 10/1962 | Hintzen | 280/96.2 R |
| 3,073,617 | 1/1963 | Schultz | 280/96.2 R |
| 3,075,786 | 1/1963 | Freers | 280/96.2 R |

Primary Examiner—Philip Goodman
Attorney, Agent, or Firm—Clifford L. Sadler; Keith L. Zerschling

[57] ABSTRACT

The present disclosure concerns an independent wheel suspension for motor vehicles having a wheel support member that is connected to vehicle body structure by upper and lower suspension arms so as to accommodate jounce and rebound movement of the wheel. In accordance with the disclosure one of the arms is connected to the wheel support member by means of a ball joint which has its socket secured to the arm and the shank of its ball stud secured to the wheel support member by a resilient bushing. The annular rubber element of the bushing isolates vibration and road noises occurring at the wheel support member from being transmitted through the suspension arm to the vehicle body structure. It also permits wheel compliance in response to minor impacts upon the road wheel.

5 Claims, 2 Drawing Figures

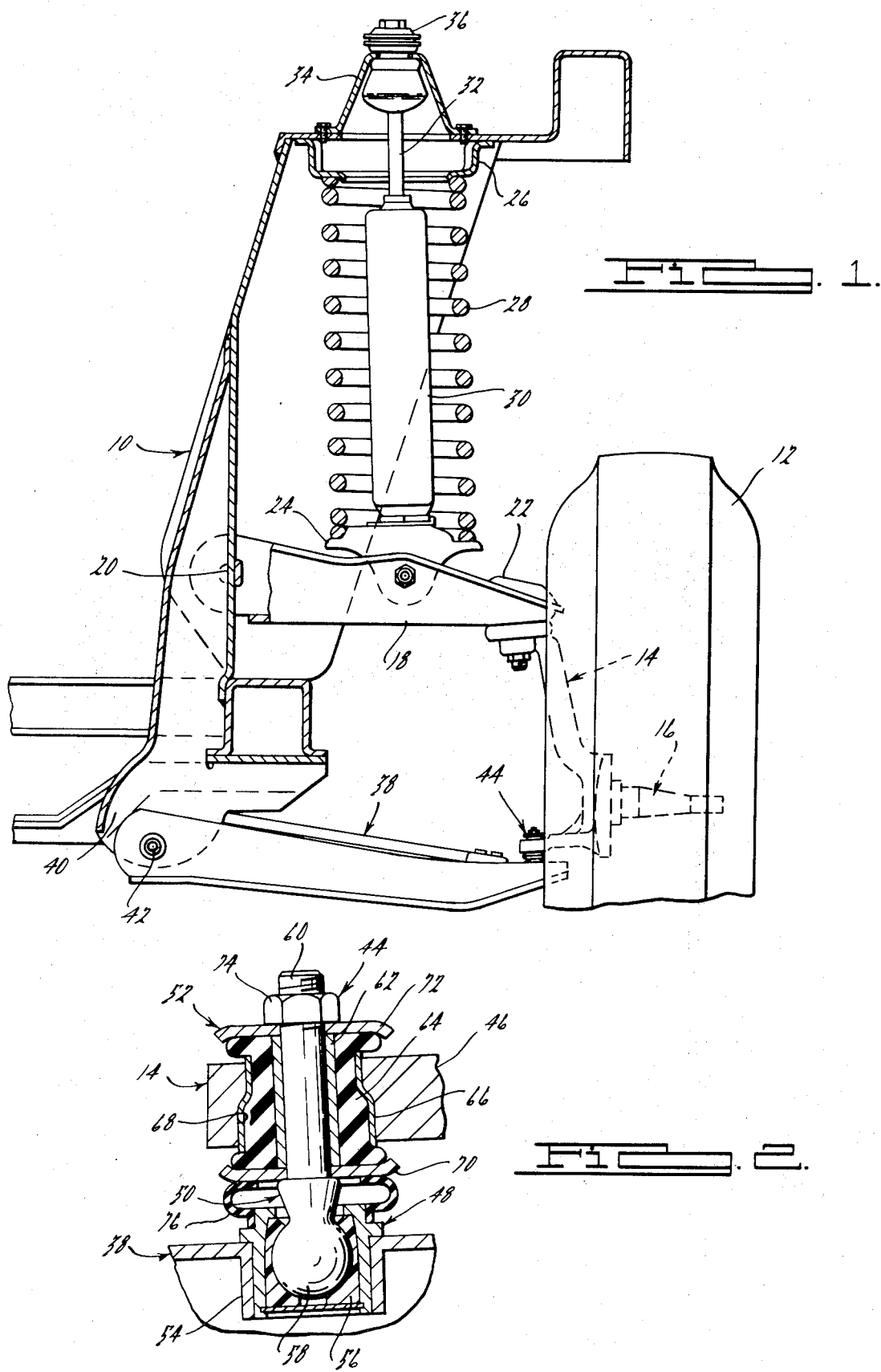

INDEPENDENT WHEEL SUSPENSION FOR MOTOR VEHICLES

BACKGROUND OF THE INVENTION

The present invention relates to independent wheel suspensions for motor vehicles, and more particularly to independent suspensions having upper and lower suspension arms that interconnect the wheel support members or wheel spindles with vehicle body structure.

It is an object of the invention to provide a means at the connection between the wheel support member and the suspension arms that prevents vibration and road noises from being transmitted through the wheel support member to the suspension arm.

BRIEF SUMMARY OF THE DISCLOSURE

In accordance with the presently preferred embodiment of this invention, an independent suspension system includes a steerable wheel support member that rotatably supports a road wheel. Upper and lower suspension arms are pivotally connected to vehicle body structure and have their outer ends connected to the wheel support member by ball joints. A suspension spring is interposed between the upper suspension arm and the vehicle body. The lower suspension arm is connected to the wheel support member by a novel resilient bushing that attenuates the transmission of noise and vibration from the wheel support member to the lower arm.

A ball and socket joint has its socket portion secured at the outer end of the lower arm. An annular resilient bushing surrounds the shank of the ball stud portion of the joint and is secured to the wheel support member. The bushing contains an annular rubber element which has a longitudinal axis arranged generally vertical. The rubber dampens vibrations which tend to be transmitted from the wheel support member to the arm. In addition, the resiliency of the rubber permits the wheel support member to move in a horizontal plane in response to minor impact forces which are imposed upon the wheel such as when the wheel encounters a tar strip or expansion joint in concrete pavement. The rubber element permits the wheel to deflect in response to the minor impact thereby minimizing the transmission of the shock of the impact to the suspension arm.

BRIEF DESCRIPTION OF THE DRAWINGS

The many objects and advantages of an independent suspension system for a motor vehicle constructed in accordance with this invention will become apparent upon consideration of the following detailed description and the accompanying drawings, in which:

FIG. 1 is a front elevational view of a wheel suspension incorporating a preferred form of the invention.

FIG. 2 is an enlarged sectional view of a portion of the wheel support member, the lower suspension arm and the resilient pivot means between the wheel support member and arm.

DETAILED DESCRIPTION OF THE PREFERRED EMBODIMENT

Referring now to the drawings, wherein the presently preferred embodiment of this invention is disclosed, FIG. 1 shows vehicle body structure 10, a road wheel 12 and a novel suspension means supporting the body upon the wheel.

The wheel 12 is rotatably supported on a steerable wheel support member 14. The member 14 has a spindle portion 16 that carries the wheel bearings. The entire wheel support member 14 is sometime known in the art as a wheel spindle.

An upper suspension arm 18 extends in a generally lateral direction from its pivotal connection 20 with a portion of the vehicle body structure 10. Part of the wheel support member 14 extends upwardly and is pivotally connected to the outer end of the upper arm 18 by means of a ball joint 22. A lower spring seat 24 is pivotally supported on the upper arm 18 and an upper spring seat 26 is welded to the body structure 10. A coil spring 28 is interposed between the lower spring seat 24 and the upper spring seat 26 to provide a means for resiliently supporting the vehicle body on the wheel 12.

A telescopic hydraulic shock absorber 30 has its lower end secured to the pivotable spring seat 24. A piston rod 32 extends upwardly from the shock absorber 30 and is connected to a portion 34 of the body structure 10 by means of a bayonet-type mount 36.

A lower suspension arm 38 has an inner end pivotally connected to a frame component 40 of the body structure 10 by means of a pivot 42.

According to the present invention, a resilient pivot means 44 connects the outer end of the arm 38 with an inwardly extending portion 46 of the wheel support member 14. The principal components of the resilient pivot means 44 include a ball joint socket 48, a ball stud 50 and an annular resilient bushing 52.

The lower suspension arm 38 is provided with a flange 54 of generally cylindrical construction. The ball joint socket 48 is positioned in the opening defined by the flange 54 and is secured thereto by means of a press fit. A bearing 56 within the socket 48 pivotally supports the ball portion 58 of the ball stud 50. The shank portion 60 of the stud 50 extends through the resilient bushing 52.

The bushing 52 comprises a cylindrical tube or sleeve 62 that surrounds the shank 60 of the ball stud 50 and an annular rubber element 64 that surrounds the tube 62. The outer sleeve 60 is of dual diameter and has an intermediate connecting shoulder. A dual diameter hole 68 is provided in the portion 46 of the wheel support member 14. The hole 68 compliments the configuration of the sleeve 66 but is of slightly smaller size so that when the bushing 52 is inserted into the hole 68 it is secured in position by a press-fit. The sleeve 66 is located properly by the engagement of its shoulder with the shoulder of the hole 68.

A washer 70 is positioned at the lower end of the inner tube 66 and the annular rubber element 64. It is seated against the head portion 58 of the ball stud 50. A second washer 72 is slipped over the shank 60 of the stud 50 and positioned against the upper end of the tube 62 and the rubber element 64. A nut 74 is threaded on end of the stud 60 and tightened so that the ends of the rubber 64 are distorted outwardly as seen in FIG. 2. Tightening of the the nut 74 loads the rubber 64 in compression and the amount of compression is determined by the length of the inner sleeve 62. The tube 62 limits the extent to which the nut 74 can be tightened.

A resilient boot seal 76 surrounds the end of the socket 48 and engages the washer 70. It prevents the entry of contaminants into the socket bearing 56.

OPERATION

When the vehicle of FIG. 1 is driven along the highway, the wheel 12 will traverse a jounce and rebound vertical path in accordance with road irregularities. The spring 28 will resiliently support the vehicle body 10 upon the suspension and upon the wheel 12. The shock absorber 34 will dampen movement of the body 10 with respect to the suspension.

The upper ball joint 22 and the resilient pivot means 44 permit the wheel 12 and spindle 14 to be pivoted about a vertical axis for steering purposes.

Noise and vibration occurring at the wheel 12 and therefore, at the wheel support member 14 will be isolated from the lower arm 38 by the resilient pivot means 44. The rubber element 64 will function as a damper to absorb such vibrations. In addition, minor impacts upon the wheel 12 will be absorbed and not transmitted to the suspension arm 38. For an example, when the wheel 12 strikes a tar strip or expansion joint in concrete pavement the impact will cause the wheel to move horizontally under impact whereby the shock will be absorbed rather than being transmitted to the suspension arm 38.

In summary, the rubber element 64 functions as an absorber or isolator with respect to vibrations of the wheel support member 14. It also acts as a compliant member to permit the wheel support member 14 to move horizontally under the force of an impact load. The inner tube 62 is provided for the purpose of controlling the compression of the rubber member 64 and, therefore, the extent to which the rubber element may reflect under load.

The foregoing description presents the presently preferred embodiment in this invention. Details of construction have been presented for purposes of illustration and not limitation. Modifications and alterations may occur to those skilled in the art which will come within the scope and spirit of the invention as defined in the following claims.

I claim:

1. An independent wheel suspension for a motor vehicle comprising vehicle body structure, a steerable wheel support member and suspension means interconnecting said body structure and said wheel support member;
    said suspension means including a suspension arm member having its inner end pivotally connected to said body structure;
    resilient pivot means connecting the outer end of said arm member to said wheel support member;
    said resilient pivot means comprising an elastomeric bushing and a ball and socket joint;
    said elastomeric bushing including an inner rigid sleeve, an intermediate annular elastomeric element and an outer rigid sleeve;
    said rigid sleeves and said elastomeric element having coaxial axes arranged generally vertical;
    said ball and socket joint having a ball stud with a shank portion positioned in and secured to said inner rigid sleeve;
    said ball and socket joint also having a socket positioned about a ball end of said ball stud;
    said socket of said ball and socket joint being rigidly secured to one of said members;
    said outer sleeve of said elastomeric bushing being rigidly secured to the other of said members;
    said elastomeric element being constructed to permit resilient horizontal deflection of said wheel support member relative to said arm member.

2. An independent wheel suspension according to claim 1 and including:
    a second suspension arm member pivotally connected to said body structure and said wheel support member,
    a suspension spring interposed between one of said suspension arm members and said body structure.

3. An independent wheel suspension for a motor vehicle comprising vehicle body structure, a steerable wheel support member and suspension means interconnecting said body structure and said wheel support member;
    said suspension means including a suspension arm member having its inner end pivotally connected to said body structure;
    resilient pivot means connecting the outer end of said arm member to said wheel support member;
    said resilient pivot means comprising an elastomeric bushing and a ball and socket joint;
    said elastomeric bushing including an inner rigid sleeve, an intermediate annular elastomeric element and an outer rigid sleeve;
    said rigid sleeves and said elastomeric element having coaxial axes arranged generally vertical;
    said ball and socket joint having a ball stud with a shank portion positioned in and secured to said inner rigid sleeve;
    said ball and socket joint also having a socket positioned about a ball end of said ball stud;
    said socket of said ball and socket joint being rigidly secured to one of said members;
    said outer sleeve of said elastomeric bushing being rigidly secured to the other of said members;
    said elastomeric element being constructed to permit resilient horizontal deflection of said wheel support member relative to said arm member;
    means constructed to compressively load said annular elastomeric element and thereby increase the spring rate of said resilient horizontal deflection of said wheel support member relative to said arm member;
    said outer sleeve being shorter than said inner sleeve;
    said inner sleeve being constructed to limit the compressive loading of said annular elastomeric element and thereby limit the spring rate of said resilient horizontal deflection of said wheel member relative to said arm member.

4. An independent wheel suspension for a motor vehicle comprising vehicle body structure, a steerable wheel support member and suspension means interconnecting said body structure and said wheel support member;
    said suspension means including upper and lower suspension arms pivotally connected to said body structure;
    pivot means connecting said upper arm to said wheel support member;
    a suspension spring interposed between said upper arm and said body structure;
    resilient pivot means connecting the outer end of said lower arm to said wheel support member;
    said resilient pivot means comprising an elastomeric bushing and a ball and socket joint;

said elastomeric bushing including an inner rigid sleeve, an intermediate annular elastomeric element and an outer rigid sleeve;
said rigid sleeves and said elastomeric element having coaxial axes arranged generally vertical;
said ball and socket joint having a ball stud with a shank portion positioned in and secured to said inner rigid sleeve;
said ball and socket joint also having a socket positioned about a ball end of said ball stud;
said socket of said ball and socket joint being rigidly secured to said lower suspension arm;
said outer sleeve of said elastomeric bushing being rigidly secured to said wheel support member;
said elastomeric element being constructed to permit resilient horizontal deflection of said wheel support member relative to said lower suspension arm.

5. An independent wheel suspension for a motor vehicle comprising vehicle body structure, a steerable wheel support member and suspension means interconnecting said body structure and said wheel support member;
said suspension means including upper and lower suspension arms pivotally connected to said body structure;
pivot means connecting said upper arm to said wheel support member;
a suspension spring interposed between said upper arm and said body structure;
resilient pivot means connecting the outer end of said lower arm to said wheel support member;
said resilient pivot means comprising an elastomeric bushing and a ball and socket joint;
said elastomeric bushing including an inner rigid sleeve, an intermediate annular elastomeric element and an outer rigid sleeve;
said rigid sleeves and said elastomeric element having coaxial axes arranged generally vertical;
said ball and socket joint having a ball stud with a shank portion positioned in and secured to said inner rigid sleeve;
said ball and socket joint also having a socket positioned about a ball end of said ball stud;
said socket of said ball and socket joint being rigidly secured to said lower suspension arm;
said outer sleeve of said elastomeric bushing being rigidly secured to said wheel support member;
said elastomeric element being constructed to permit resilient horizontal deflection of said wheel support member relative to said lower suspension arm and thereby attenuate the transmission of vibrations from said wheel support member to said lower suspension arm;
a nut threadedly engaging the end of said ball stud and constructed to compressively load said elastomeric element thereby increasing the spring rate of said elastomeric element resisting said resilient horizontal deflection of said wheel support member relative to said lower suspension arm;
said inner sleeve surrounding said shank constructed to limit the compressive loading of said elastomeric element and thereby limit the spring rate of said elastomeric element.

* * * * *